UNITED STATES PATENT OFFICE.

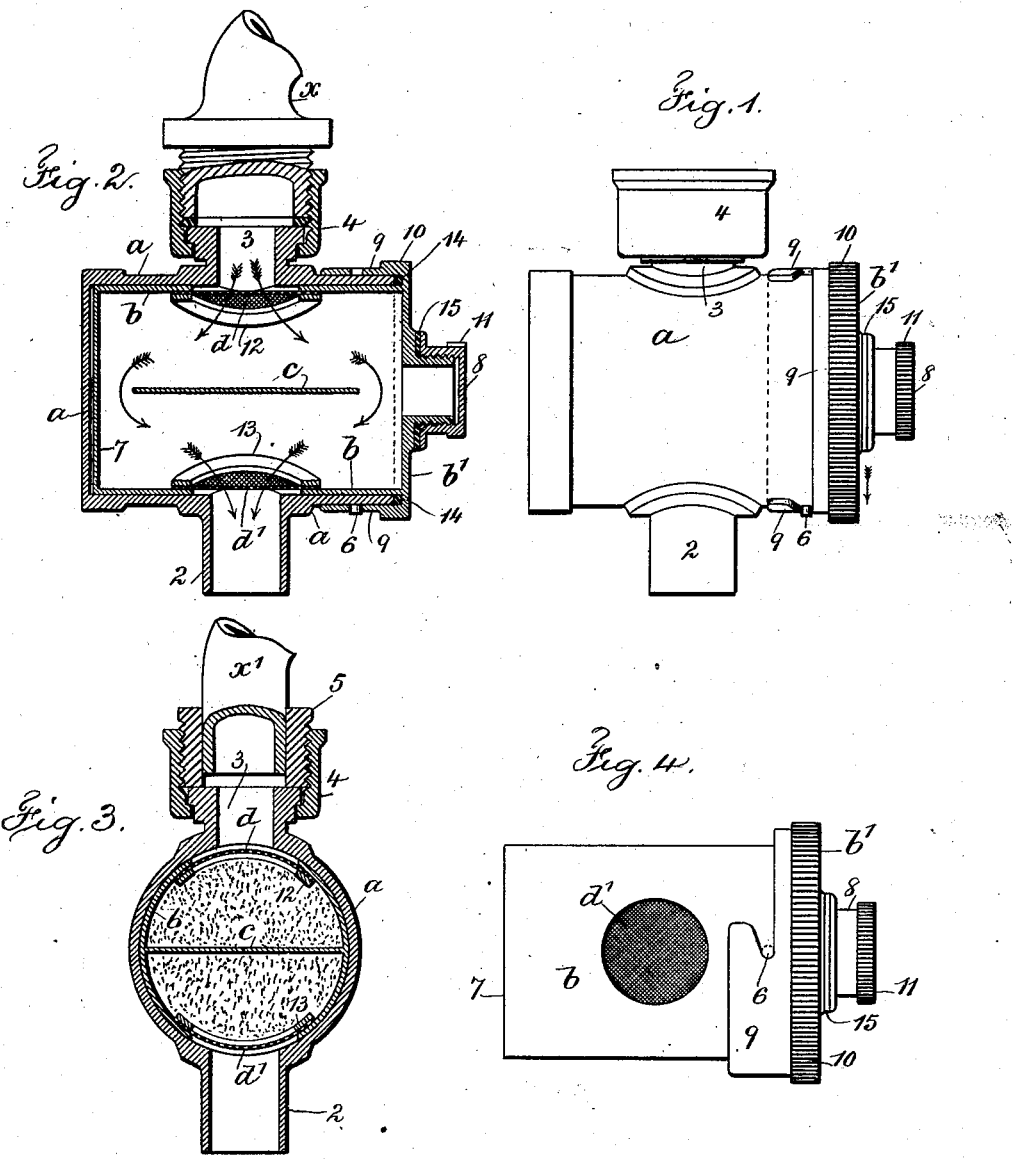

NELSON STAFFORD, OF NEW YORK, N. Y., ASSIGNOR TO N. STAFFORD COMPANY, OF NEW YORK, N. Y., A CORPORATION OF NEW JERSEY.

FILTER.

SPECIFICATION forming part of Letters Patent No. 724,752, dated April 7, 1903.

Application filed November 4, 1902. Serial No. 130,027. (No model.)

*To all whom it may concern:*

Be it known that I, NELSON STAFFORD, a citizen of the United States, residing in the borough of Brooklyn, county of Kings, city and State of New York, have invented an Improvement in Filters, of which the following is a specification.

My invention relates especially to that class of filters adapted for attachment to a faucet of ordinary construction for filtering water and which device can be readily applied to or removed from a faucet. I provide a cylindrical casing occupying a horizontal position, closed at one end and open at the other end, provided with a discharge-nozzle, an inlet-nozzle, and coupling device for connecting the same to a faucet of ordinary construction. A filter-cylinder fits within the cylindrical case and is revoluble therein at least to the extent of being reversible. This filter-cylinder is closed at one end and at the other end is provided with an apertured head closed by a screw-cap, and the said head is made with a flange surrounding the cylindrical case, and coacting means are provided as parts of the cylindrical case and flange of the filter-cylinder for retaining the filter-cylinder in position and determining its location. Said filter has opposite apertures, in which are disks of wire-gauze, and a central partition secured thereto at said apertures. The filtering material—such as sand, charcoal, a mixture thereof, or other suitable materials—are placed in the filter-cylinder, and the water to be filtered runs into the top around the partition, through the filtering material, out through the bottom aperture, and escapes by the discharge-nozzle of the cylindrical case. The filter-cylinder can be quickly reversed by giving the same a half-rotation, so as to change the position of the apertures and cause the water passing through to go in the opposite direction, which will first clean out the filter, rearranging the filtering material, so that the same thereafter filters the oncoming water.

In the drawings, Figure 1 is an elevation representing my improvement. Fig. 2 is a vertical longitudinal section. Fig. 3 is a vertical cross-section, and Fig. 4 is a plan of the filter-cylinder alone.

The cylindrical case $a$ is closed at one end and open at the other end, and the same occupies a horizontal position. A discharge-nozzle 2 extends from the central portion at one side of the case and an inlet-nozzle 3 from the central portion at the other side of the case. A coupling 4 surrounds the inlet-nozzle 3, and the same is interiorly threaded to screw upon the end of a faucet of ordinary construction. A rubber bushing 5, advantageously exteriorly threaded, may screw into the coupling 4 and receive a smooth and plain faucet of ordinary construction and to which by this rubber bushing the filter device is frictionally held.

In Fig. 2 I have shown the exteriorly-threaded faucet $x$ and in Fig. 3 the plain-surface faucet $x'$. The cylindrical case $a$ is provided with a pin 6 for the purpose hereinafter described. $b$ represents the filter-cylinder, closed by an end 7 and provided with opposite apertures. $b'$ represents an apertured head to said cylinder, and 8 a screw-cap closing the aperture and provided with a packing 15. The head $b'$ is provided with a flange 9, spaced away from the filter-cylinder $b$ sufficiently to receive between said parts the open end of the cylindrical case $a$, and at the base of this opening there is a packing 14, adapted to come against the end of the cylindrical case and form a tight joint. This flange 9 not only surrounds the cylindrical case, but it is cut away at one side for about half of the circumference and provided with opposite notches to receive the pin 6 in succession.

I prefer to roughen or knurl the surfaces of the head $b'$ and screw-cap 8 at 10 and 11, so as to more readily grasp said parts when turning the filter-cylinder or removing the screw-cap. This filter-cylinder $b$ is provided with a partition $c$, which from Fig. 3 extends across the filter-cylinder $b$ and which from Fig. 2 runs for the greater portion of the length of said cylinder. There are spaces between the ends of the partition $c$ and the end 7 and between the partition $c$ and the apertured head $b'$, and this partition $c$ is in a horizontal plane with both positions of the filter-cylinder. In the opposite apertures of said filter-cylinder are wire-gauze disks $d$ and $d'$, which are securely held in position to the adjacent parts of the filter-cylinder $b$ by rings 12 13, the parts being preferably soldered together.

In the position of the parts, Figs. 1, 2, and 3, the water enters by the faucet $x$ or $x'$ through the inlet-nozzle 3, through the wire-gauze disk $d$ into the filter-cylinder $b$, and by virtue of the partition $c$ passes to either end of said cylinder and around the ends of the partition into the lower portion of the filter-cylinder through the wire-gauze $d'$ and away by the discharge-nozzle $a$.

Any suitable filtering material may be placed in the filter-cylinder $b$—such as sand, charcoal, or a mixture of the same—and the water in transit is compelled to pass through this filtering material, which may completely or partially fill the filter-cylinder. After the water has run a time in this direction said filter-cylinder $b$ is given a half-revolution, or, in other words, is reversed in its position in the direction of the arrow, Fig. 1, so that the part of the notched flange that was above is now beneath, engaging the pin 6. With this reversal the water tends not only to shift the position of the filtering material, but to agitate the same and remove therefrom any accumulations, animal matter, or germs that may have been removed from the water, and the first water is of course waste. As soon as this is washed out and the filtering material settles into the new position the water filters clear again. This reversal can be kept up as frequently as desired.

Should it be desired to kill any animal matter or microbes in the filter, the same can readily be done by imparting sufficient of a revolution to the filter-cylinder $b$ to remove the pin 6 from engagement with the flange 9 and then to pull out the filter-cylinder and stand the same upon the end 7 in a vessel of boiling water, which will effectually kill any germs that there may be within said filter-cylinder. When it is desired to remove the sand or other filtering material to replace the same with new, this may readily be done by placing the filter-cylinder $b$ into a vessel of water with the screw-cap 8 removed, so that the water enters the apertures in which are the wire-gauze disks $d$ $d'$, and then moving the filter-cylinder up and down and agitating the same, so that the sand or other filtering material being heavier than the water will not only act to clear out the inside of the filter-cylinder, but the same will fall out of the aperture in the head $b'$. With the filter-cylinder empty new and fresh material can readily be inserted through the aperture in the head $b'$ and the screw-cap 8 replaced preparatory to placing the filter-cylinder in the case $a$ and holding the same in place by the pin 6, engaging one of the notches of the flange 9.

I claim as my invention—

1. In a filter the combination with a cylindrical case, and devices connected therewith for securing the same to a faucet of ordinary construction, said case being provided with inlet and discharge nozzles, of a revoluble filter-cylinder received within and fitting the cylindrical case and having opposite apertures permitting the passage of the water to be filtered, an opening in one end of the filter-cylinder for introducing filtering material and removing the same, a cap for closing the opening and devices connected respectively to the cylindrical case and the filter-cylinder and coacting with one another for controlling the relative positions of the parts and limiting the revolubility of the filter-cylinder in the cylindrical case, substantially as set forth.

2. In a filter, the combination with a cylindrical case having inlet and discharge nozzles, a coupling and a threaded rubber bushing within the same for connecting the filter-case to a plain faucet of ordinary construction, of a revoluble filter-cylinder received within and fitting the cylindrical case, provided with opposite apertures having wire-gauze disks therein and forming passage-ways for water, devices at one end of said filter-cylinder for inserting and removing the filtering material, and devices connected to the case and cylinder and coacting to connect the parts and limit the revolubility of the filter-cylinder with reference to the cylindrical case, substantially as set forth.

3. A filter for water, comprising a cylindrical case placed horizontally, closed at one end and open at the other end and provided with a discharge-nozzle from the lower portion and an inlet-nozzle and a coupling at the upper portion for connecting the case to a faucet of ordinary construction, a revoluble filter-cylinder also occupying a horizontal position fitting and received within the cylindrical case, closed at one end and having an apertured head and closing-cap at the other end and provided with opposite apertures in line with the inlet and discharge nozzles for the passage of the water to be filtered, a flange connected to the apertured head of the filter-cylinder having a cut-away portion and opposite notches, and a pin coacting therewith to control the respective reversed positions of the filter-cylinder, substantially as set forth.

4. A filter for water, comprising a cylindrical case placed horizontally, closed at one end and open at the other end and provided with a discharge-nozzle from the lower portion and an inlet-nozzle and a coupling at the upper portion for connecting the case to a faucet of ordinary construction, a revoluble filter-cylinder closed at one end and having an apertured head and removable cap therefor closing the other end, opposite apertures in line with the inlet and discharge nozzles and wire-gauze disks in said apertures, a partition within and dividing the filter-cylinder substantially into two chambers, and means connected respectively to the head of the filter-cylinder and to the cylindrical case and coacting to limit the reversed positions of the filter-cylinder with reference to the cylindrical case, substantially as set forth.

5. A filter for water comprising a cylindrical case with inlet and discharge nozzles, and means for connecting the same to a faucet, a revoluble filter-cylinder fitting and received within the cylindrical case, closed at one end and provided with an apertured head and closing-cap at the other end, opposite apertures in line with the inlet and discharge apertures of the case, wire-gauze disks and means for securing the same to the filter-cylinder at the opposite apertures, a partition extending centrally and longitudinally through the filter-cylinder and free at its respective ends from the closed end and head of the filter-cylinder, so that the filter-cylinder is substantially divided by the partition into two chambers, and means forming part of the filter-cylinder and the cylindrical case respectively and coacting to permit a half-revolution to be given to the filter-cylinder and to secure the same at such positions, substantially as set forth.

Signed by me this 29th day of October, 1902.

N. STAFFORD.

Witnesses:
GEO. T. PINCKNEY,
S. T. HAVILAND.